(12) United States Patent
Patrickson et al.

(10) Patent No.: US 12,017,951 B2
(45) Date of Patent: Jun. 25, 2024

(54) COATED GLASS SUBSTRATE

(71) Applicant: PILKINGTON GROUP LIMITED, Lathom (GB)

(72) Inventors: Charlie James Patrickson, Lathom (GB); Rachel Yeates, St. Helens (GB); Philip Savage, St. Helens (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 17/776,281

(22) PCT Filed: Nov. 13, 2020

(86) PCT No.: PCT/GB2020/052889
§ 371 (c)(1),
(2) Date: May 12, 2022

(87) PCT Pub. No.: WO2021/094765
PCT Pub. Date: May 20, 2021

(65) Prior Publication Data
US 2022/0402814 A1    Dec. 22, 2022

(30) Foreign Application Priority Data

Nov. 13, 2019 (GB) .................................. 1916515

(51) Int. Cl.
*B32B 15/04* (2006.01)
*B32B 17/06* (2006.01)
*C03C 17/36* (2006.01)

(52) U.S. Cl.
CPC ...... *C03C 17/3626* (2013.01); *C03C 17/3605* (2013.01); *C03C 17/3644* (2013.01);
(Continued)

(58) Field of Classification Search
CPC .................................................. C03C 17/366
(Continued)

(56) References Cited

U.S. PATENT DOCUMENTS 5,591,529 A * 1/1997 Braatz .................... G02B 5/208
                                                       359/359
5,821,001 A * 10/1998 Arbab ................. C03C 17/3618
                                                       428/630

(Continued)

FOREIGN PATENT DOCUMENTS

CN         105473328 A      4/2016
EP           1371745 A1    12/2003
(Continued)

OTHER PUBLICATIONS

UK Intellectual Property Office, GB Search Report, issued in GB1916515.8, Apr. 16, 2020, 1 page, Newport, South Wales, United Kingdom.

(Continued)

*Primary Examiner* — Lauren R Colgan
(74) *Attorney, Agent, or Firm* — Marshall & Melhorn, LLC (57) ABSTRACT

The present invention relates to a coated glass substrate, a method of preparing same and the use thereof in a multiple glazing unit, the coated comprising at least the following layers in sequence from the glass substrate: a lower anti-reflection layer; a silver-based functional layer; a barrier layer; and an upper anti-reflection layer, wherein the upper anti-reflection layer comprises a dielectric layer of an oxynitride of aluminium (Al), zinc (Zn) and tin (Sn) with at least 5 atomic percent aluminium (Al).

23 Claims, 1 Drawing Sheet (52) U.S. Cl.
CPC ........ *C03C 17/366* (2013.01); *C03C 17/3681* (2013.01); *C03C 2217/211* (2013.01); *C03C 2217/216* (2013.01); *C03C 2217/256* (2013.01); *C03C 2217/732* (2013.01)

(58) Field of Classification Search
USPC ........................................ 428/428, 432, 434
See application file for complete search history.

(56) References Cited

U.S. PATENT DOCUMENTS

| | | | | |
|---|---|---|---|---|
| 6,432,545 | B1* | 8/2002 | Schicht | C03C 17/3681 428/428 |
| 6,541,133 | B1* | 4/2003 | Schicht | C03C 17/2453 428/673 |
| 6,783,876 | B2* | 8/2004 | Schicht | C03C 17/3644 428/673 |
| 6,899,953 | B1* | 5/2005 | O'Shaughnessy | C03C 17/366 428/432 |
| 6,994,910 | B2 | 2/2006 | Stachowiak | |
| 8,043,707 | B2* | 10/2011 | Schicht | C23C 14/086 428/689 |
| 8,497,014 | B2* | 7/2013 | Unquera | C03C 17/3613 428/432 |
| 8,900,729 | B2* | 12/2014 | Imran | C03C 17/366 428/688 |
| 9,045,363 | B2* | 6/2015 | Hassan | C23C 14/3464 |
| 9,126,862 | B2* | 9/2015 | Kim | C03C 17/3681 |
| 9,315,414 | B2 | 4/2016 | Hassan et al. | |
| 9,499,899 | B2* | 11/2016 | Zhang | C03C 17/3639 |
| 9,630,875 | B2* | 4/2017 | McSporran | C03C 17/366 |
| 9,919,497 | B2 | 3/2018 | Reutler et al. | |
| 9,981,873 | B2 | 5/2018 | Noethe et al. | |
| 10,150,697 | B2* | 12/2018 | McSporran | C03C 17/3644 |
| 11,192,820 | B2* | 12/2021 | Hughes | C03C 17/3644 |
| 2005/0164012 | A1* | 7/2005 | Carson | C03C 17/3441 428/432 |
| 2005/0205416 | A1 | 9/2005 | Stachowiak | |
| 2008/0187692 | A1* | 8/2008 | Roquiny | C03C 17/3626 428/432 |
| 2009/0047509 | A1* | 2/2009 | Gagliardi | C03C 17/3644 428/428 |
| 2009/0136765 | A1* | 5/2009 | Maschwitz | C03C 17/3652 427/160 |
| 2009/0169846 | A1* | 7/2009 | Siddle | C03C 17/3618 428/432 |
| 2009/0197077 | A1* | 8/2009 | Reutler | C03C 17/366 428/434 |
| 2010/0136365 | A1* | 6/2010 | Unquera | C03C 17/3626 428/215 |
| 2010/0178492 | A1* | 7/2010 | Schicht | C03C 17/366 428/336 |
| 2010/0257782 | A1* | 10/2010 | Giesen | B32B 17/10761 47/17 |
| 2011/0262726 | A1* | 10/2011 | Knoll | C03C 17/36 428/428 |
| 2013/0344321 | A1* | 12/2013 | McSporran | C03C 17/3644 204/192.27 |
| 2014/0087160 | A1* | 3/2014 | McSporran | G02B 1/115 204/192.1 |
| 2014/0319687 | A1* | 10/2014 | Billet | H10K 50/805 438/669 |
| 2016/0354995 | A1* | 12/2016 | Lienhart | C03C 17/366 |
| 2018/0141314 | A1 | 5/2018 | Reutler et al. | |

FOREIGN PATENT DOCUMENTS

| | | |
|---|---|---|
| EP | 1538131 A1 | 6/2005 |
| GB | 2518899 A | 4/2015 |
| WO | WO 2004/06311 A1 | 7/2004 |

OTHER PUBLICATIONS

European Patent Office, International Search Report with Written Opinion, issued in PCT/GB2020/052889, 8 pages, European Patent Office, Rijswijk, Netherlands.

* cited by examiner

COATED GLASS SUBSTRATE

BACKGROUND OF THE INVENTION

The present invention relates to a coated glass substrate and to a process for the manufacture of same. More specifically, the invention relates to a heat-treatable coated glass substrate with a reduced number of layers in the coating and which further comprises a low-e and/or solar control coating.

Glass coatings which provide low-emissivity (low-e) and/or solar control may be deposited for example by physical vapour deposition processes, such as, sputtering. A glass coating deposited by sputtering is commonly produced by passing a glass substrate through one or more chambers with targets that are bombarded by ions or atoms. The bombarded target releases material which then coats the glass substrate. Sputtered low-emissivity and solar control coating stacks are commonly made up of repeat sequences of for example:

'substrate base anti-reflection layer sequence [silver (Ag) anti-reflection layer sequence]$_n$', with each of the 'n' anti-reflection layers not necessarily having the same thicknesses or composition. The anti-reflection layers usually include one or more dielectric layers.

There is a continual demand from the glass manufacturing industry for coated glass substrates which are able to meet the demanding performance requirements of automotive and architectural glazing with the result that, ever more complicated layer sequences (or stacks) are used to coat glass substrates based on a range of dielectric materials. Consequently, it is becoming more common in the glass manufacturing industry for 'n' in the sequence above to equal 2 or even 3 or 4.

Previously, the deposition of multiple coating layers on a glass substrate has been addressed by installing expensive extensions to a coating line in a glass manufacturing plant, to achieve a sufficient number of chambers to deposit the required different coating materials in sufficient number, thickness and order.

This has led also to the installation of extra pumping sections in the extensions, to allow multiple reactive deposition processes to run in sequence. However, this is achieved only at great expense and often with huge disruption, as the coating line usually needs to be stopped for an extended period for the required engineering installations to be completed.

Each additional chamber and pumping section also require accompanying power supplies, vacuum pumps, conveyor sections, services, instrumentation and integration into the control system. Such changes often lead to restructuring of the downstream logistics, and possibly even new civil works or building extensions. As the requirement for multiple metal layers and/or more complicated coating stacks becomes ever more common, these problems are set to increase.

In addition, dielectric layers are often both thicker and slower to deposit by sputtering than metal layers such as silver. This further increases the number of chambers required as multiple chambers may be required to deposit a single dielectric layer efficiently.

It is a requirement also of architectural or automotive glazings to provide coated glass substrates which may be heat treatable and hence toughened to impart safety properties, and/or which may be bent into a required shape.

It is known that for thermal toughening and/or bending of glass substrates (also known as tempering in the glass industry) it is necessary to heat treat the glass substrates to temperatures near or above the softening point of the glass, and then to rapidly cool and/or bend the glass substrates with the aid of suitable bending means. The toughening or bending of standard float glass of the soda lime silica type is typically achieved by heating the glass to temperatures in the region of 580 to 690° C., maintaining the glass substrates in this temperature range for several minutes, followed by initiating the actual toughening and/or bending process.

"Heat treatment", "heat treated" and "heat treatable" in the following description and claims refers to thermal bending and/or toughening processes (also known as tempering) and to other thermal processes during which a coated glass substrate reaches temperatures in the range of for example 580 to 690° C. for a period of several minutes, for example, up to about 10 minutes. A coated glass substrate is deemed to be heat treatable if it survives a heat treatment without significant damage. Examples of significant damage to glass substrates caused by heat treatments include for example, increased haze (or cloudiness), pinholes or spots.

The use of coated glass substrates with coating layers which comprise doped metal oxide layers is known. For example, in US 2009/0197077, there is described a transparent glass substrate provided with a thin-film multilayer comprising a functional layer based on silver or on a metal alloy containing silver, and two coatings composed of a plurality of dielectric layers, such that the functional layer of silver is placed between the two coatings. The functional layer is deposited on a wetting layer, itself deposited directly onto a subjacent coating. The subjacent coating comprises at least one dielectric layer based on nitride, and at least one non-crystalline smoothing layer made from a mixed oxide in the form of antimony doped zinc stannate, which is in contact with said superjacent wetting layer.

In U.S. Pat. No. 6,541,133, there is disclosed a layer stack for a surface coating of a transparent substrate, which has at least one metal oxide composite layer produced by reactive cathodic sputtering and which contains zinc (Zn) oxide and tin (Sn) oxide. Relative to the total amount of metal, this metal oxide composite layer may also contain from 0.5 to 6.5% by weight of one or more of the elements Al, Ga, In, B, Y, La, Ge, Si, P, As, Sb, Bi, Ce, Ti, Zr, Nb and Ta.

In U.S. Pat. No. 9,315,414, there is disclosed a method for forming a low-emissivity (low-e) panel based on a transparent substrate. A metal oxide layer is formed over the transparent substrate. The metal oxide layer includes oxygen, a first element, a second element, and a third element. The first element is tin or zinc. The second element is strontium, and the third element is hafnium.

However, none of the prior art documents described above provide a heat treatable coated glass substrate with a layer sequence according to the present invention, which is able to provide the desired optical properties, as well as the wear and scratch resistance requirements of the glass industry.

SUMMARY OF THE INVENTION

The aim of the present invention is to therefore provide improved heat treatable coated glass substrates, the optical properties of which do not change significantly or change by a reduced amount when heat treated. For example, the colour modification of the coated glass substrates caused by a heat treatment should preferably be such that if required, heat-treated and non-heat treated coated glass substrates may be glazed adjacent to each other without a noticeable colour difference in use.

It is also the aim of the present invention to provide heat treatable, low emissivity (low-e) and/or solar control coated glass substrates which are able to withstand ordinary environmental influences during for example, storage, transport and use, both before and after a heat treatment. Moreover, the aim of the present invention is to provide heat treatable, low emissivity (low-e) and/or solar control coated glass substrates which are able to survive mechanical and chemical conditions acting on the coated glass substrates during usual handling and processing without significant damage, as detailed below in relation to a series of tests.

The invention furthermore aims to provide heat treatable coated glass substrates with high light transmittance, a low emissivity (corresponding to a low sheet resistance) and/or good solar control properties. That is, the glass substrates have a low solar energy transmittance combined with a sufficiently high light transmittance. It is a further aim of the invention to provide such heat treatable coated glass substrates with a reduced number of coating layers compared to existing substrates, such that the capital outlay required to manufacture such coated substrates is reduced.

In summary, the present invention aims to address the problems associated with prior art processes and products as detailed above, and seeks to deliver economically efficient and commercially desirable coated glass substrates which meet the required optical properties of the glass industry in terms of for example, haze, light transmittance and colour, and which also are robust enough to withstand thermal toughening.

DETAILED DESCRIPTION OF THE INVENTION

According to a first aspect of the present invention there is provided a coated glass substrate comprising at least the following layers in sequence from the glass substrate:
  a lower anti-reflection layer;
  a silver-based functional layer;
  a barrier layer; and
  an upper anti-reflection layer,
    wherein the upper anti-reflection layer comprises:
      a dielectric layer of an oxynitride of aluminium (Al), zinc (Zn) and tin (Sn) with at least 5 atomic percent aluminium (Al).

In the coated glass substrate according to the first aspect of the present invention, the dielectric layer may comprise an oxynitride of aluminium (Al), zinc (Zn) and tin (Sn) with at least 10 atomic percent aluminium. Alternatively, the dielectric layer may comprise an oxynitride of aluminium (Al), zinc (Zn) and tin (Sn) with at least 15 atomic percent aluminium or, the dielectric layer may comprise an oxynitride of aluminium (Al), zinc (Zn) and tin (Sn) with at least 22 atomic percent aluminium.

Also, in relation to the first aspect of the present invention the dielectric layer preferably comprises an oxynitride of aluminium (Al), zinc (Zn) and tin (Sn) with at most 45 atomic percent aluminium. More preferably, the dielectric layer comprises an oxynitride of aluminium (Al), zinc (Zn) and tin (Sn) with at most 40 atomic percent aluminium. Alternatively, the dielectric layer may comprise an oxynitride of aluminium (Al), zinc (Zn) and tin (Sn) with at most 35 atomic percent aluminium.

Therefore, in a preferred embodiment of the present invention the dielectric layer preferably comprises an oxynitride of aluminium (Al), zinc (Zn) and tin (Sn) with aluminium in a range of from 5 atomic percent aluminium to 45 atomic percent aluminium. Alternatively, the dielectric layer may comprise an oxynitride of aluminium (Al), zinc (Zn) and tin (Sn) with aluminium in a range of from 5 atomic percent aluminium to 40 atomic percent aluminium. The dielectric layer may also comprise an oxynitride of aluminium (Al), zinc (Zn) and tin (Sn) with aluminium in a range from 5 atomic percent aluminium to 35 atomic percent aluminium. In one embodiment of the present invention the dielectric layer may comprises an oxynitride of aluminium (Al), zinc (Zn) and tin (Sn) with aluminium in a range of from 10 atomic percent aluminium to 35 atomic percent aluminium. In an alternative embodiment of the present invention the dielectric layer may comprises an oxynitride of aluminium (Al), zinc (Zn) and tin (Sn) with aluminium in a range of from 20 atomic percent aluminium to 35 atomic percent aluminium. In a further embodiment of the present invention the dielectric layer may comprises an oxynitride of aluminium (Al), zinc (Zn) and tin (Sn) with aluminium in a range of from 20 atomic percent aluminium to 30 atomic percent aluminium. In a preferred embodiment of the present invention the dielectric layer may comprise an oxynitride of aluminium (Al), zinc (Zn) and tin (Sn) with aluminium in a range of from 22 atomic percent aluminium to 28 atomic percent aluminium.

Preferably, the dielectric layer based on an oxynitride of aluminium (Al), zinc (Zn) and tin (Sn) comprises at most 30% atomic percent zinc and at most 15% atomic percent tin.

The dielectric layer based on an oxynitride of aluminium (Al), zinc (Zn) and tin (Sn) may preferably comprise a thickness of at least 5 nm. Alternatively, the dielectric layer based on an oxynitride of aluminium (Al), zinc (Zn) and tin (Sn) may preferably comprise a thickness of from 10 to 50 nm. More preferably, the dielectric layer based on an oxynitride of aluminium (Al), zinc (Zn) and tin (Sn) may preferably comprise a thickness of from 20 to 40 nm. Even more preferably the dielectric layer based on an oxynitride of aluminium (Al), zinc (Zn) and tin (Sn) may preferably comprise a thickness of from 30 to 40 nm. Most preferably the dielectric layer based on an oxynitride of aluminium (Al), zinc (Zn) and tin (Sn) preferably comprises a thickness of from 32 to 36 nm. Such thicknesses provide improvement in terms of mechanical robustness of the coated substrate. Said dielectric layer based on an oxynitride of aluminium (Al), zinc (Zn) and tin (Sn) may preferably be in direct contact with the layer based on an oxide of zinc (Zn) in the upper dielectric layer.

The dielectric layer based on an oxynitride of aluminium (Al), zinc (Zn) and tin (Sn) preferably provides improved stability for the coated glass substrate, that is, better protection during heat treatment and may preferably act as a diffusion barrier. In addition, the dielectric layer based on an oxynitride of aluminium (Al), zinc (Zn) and tin (Sn) may preferably act as protective layer providing increased mechanical and/or chemical robustness, such as for example scratch resistance.

Also in relation to the present invention, the lower anti-reflection layer may preferably comprise in sequence from the glass substrate:
  a layer based on an oxide of zinc (Zn) and tin (Sn) or an oxide of tin (Sn); and
  a layer based on an oxide of zinc (Zn).

The layer based on an oxide of zinc (Zn) and tin (Sn) or an oxide of tin (Sn) preferably has a thickness of from 0.5 to 10 nm.

The lower anti-reflection layer may also preferably comprise one or more base layer based on an (oxi)nitride of silicon and/or aluminium, and/or an alloy of silicon and/or aluminium.

The one or more base layer based on an (oxi)nitride of silicon and/or aluminium, and/or an alloy of silicon and/or aluminium is preferably located between the glass substrate and the layer based on an oxide of zinc (Zn) and tin (Sn) or an oxide of tin (Sn), in the lower anti-reflection layer. Preferably, the base layer comprises a thickness of from 20 to 40 nm.

In addition, the base layer may preferably be in direct contact with the layer based on an oxide of zinc (Zn) and tin (Sn) or an oxide of tin (Sn).

Therefore, in relation to the present invention the lower anti-reflection layer may preferably comprise in direct sequence from the glass substrate:
 a base layer based on an (oxi)nitride of silicon and/or aluminium, and/or an alloy of silicon and/or aluminium;
 a layer based on an oxide of zinc (Zn) and tin (Sn) or an oxide of tin (Sn);
 a separation layer based on: a metal oxide; and/or an (oxi)nitride of silicon and/or aluminium; and/or an alloy of silicon and/or aluminium; and
 a layer based on an oxide of zinc (Zn).

Alternatively, the lower anti-reflection layer may preferably comprise in direct sequence from the glass substrate:
 a base layer based on an (oxi)nitride of silicon and/or aluminium, and/or an alloy of silicon and/or aluminium;
 a layer based on an oxide of zinc (Zn) and tin (Sn) or an oxide of tin (Sn); and
 a layer based on an oxide of zinc (Zn).

That is, the lower anti-reflection layer may preferably include three or four layers in sequence as described above. Whether the lower anti-reflection layer preferably includes three or four layers as described above will depend upon the number of silver-based functional layers present in the coating sequence.

It is preferred that when the coating sequence comprises only a single silver-based coating layer that the lower anti-reflection layer preferably consists of four layers in sequence as described above, including a separation layer. Alternatively, when the coating sequence comprises more than one silver-based coating layer, the lower anti-reflection layer preferably consists of three layers in sequence as described above, that is, a separation layer is not present.

The base layer based on an (oxi)nitride of silicon and/or aluminium, and/or an alloy of silicon and/or aluminium of the lower anti-reflection layer may preferably comprise a thickness of at least 5 nm. More preferably, the base layer comprises a thickness of from 5 to 60 nm. Even more preferably the base layer comprises a thickness of from for example: 10 to 50 nm; 15 to 45 nm; or 20 to 40 nm. Most preferably the base layer of the lower anti-reflection layer comprises a thickness of from 25 to 35 nm. One use of the base layer in the coated glass substrate of the present invention is to serve as a glass side diffusion barrier, that is, the barrier layer seeks to prevent migration of for example sodium ions into the coating layers.

The term "(oxi)nitride of silicon" encompasses both silicon (Si) nitride ($SiN_x$) and silicon (Si) oxinitride ($SiO_xN_y$), whilst the term "(oxi)nitride of aluminium" encompasses both aluminium (Al) nitride ($AlN_x$) and aluminium (Al) oxinitride ($AlO_xN_y$). Silicon (Si) nitride, silicon (Si) oxinitride, aluminium (Al) nitride and aluminium (Al) oxinitride layers are preferably essentially stoichiometric (for example, in silicon nitride=$Si_3N_4$, the value of x in $SiN_x$=1.33) but may also be sub-stoichiometric or even super-stoichiometric, as long as the heat treatability of the coating is not negatively affected thereby. One preferred composition of the base layer based on an (oxi)nitride of silicon and/or an (oxi)nitride of aluminium of the lower anti-reflection layer is an essentially stoichiometric mixed nitride $Si_{90}Al_{10}N_x$.

Layers of an (oxi)nitride of silicon and/or an (oxi)nitride of aluminium may be reactively sputtered from silicon (Si-) and/or aluminium (Al)-based targets respectively in a sputtering atmosphere containing nitrogen and argon. An oxygen content of the base layer based on an (oxi)nitride of silicon and/or an (oxi)nitride of aluminium may result from residual oxygen in the sputtering atmosphere or from a controlled content of added oxygen in said atmosphere. It is generally preferred if the oxygen content of the silicon (oxi)nitride and/or aluminium (oxi)nitride is significantly lower than its nitrogen content, that is, if the atomic ratio O/N in the layer is kept significantly below 1. It is most preferred to use silicon nitride and/or aluminium nitride with negligible oxygen content for the base layer of the lower anti-reflection layer. This feature may be controlled by making sure that the refractive index of the layer does not differ significantly from the refractive index of an oxygen-free Si nitride and/or aluminium nitride layer.

It is within the scope of the invention to use mixed silicon (Si) and/or aluminium (Al) targets or to otherwise add metals or semiconductors to the silicon (Si) and/or aluminium (Al) component of this layer as long as the essential barrier and protection property of the base layer of the lower anti-reflection layer is not lost. For example, the aluminium (Al) with silicon (Si) targets may be mixed, other mixed targets not being excluded. Additional components may be typically present in amounts of from 10 to 15 weight %. Aluminium is usually present in mixed silicon targets in an amount of 10 weight %.

The layer based on an oxide of zinc (Zn) and tin (Sn) or based on an oxide of tin (Sn) of the lower anti-reflection layer preferably improves stability during heat treatment, by providing a dense and thermally stable layer, and also contributes to haze reduction after heat treatment. The layer based on an oxide of zinc (Zn) and tin (Sn) or based on an oxide of tin (Sn) of the lower anti-reflection layer may preferably have a thickness of at least 0.5 nm. Preferably the layer based on an oxide of zinc (Zn) and tin (Sn) or based on an oxide of tin (Sn) of the lower anti-reflection layer may have a thickness of from: 0.5 to 15 nm; or 0.5 to 13 nm; or 0.5 to 10 nm; or 1 to 12 nm. In addition, the layer based on an oxide of zinc (Zn) and tin (Sn) or based on an oxide of tin (Sn) of the lower anti-reflection layer may have a thickness of from: 1 to 7 nm; or 2 to 6 nm; or 3 to 6 nm. Most preferably the layer based on an oxide of zinc (Zn) and tin (Sn) or based on an oxide of tin (Sn) of the lower anti-reflection layer may have a thickness of from 3 to 5 nm for a coated glass substrate with a layer sequence comprising a single silver-based functional layer. An upper thickness limit in the region of 8 nm may be preferred also due to optical interference conditions and by a reduction of heat treatability due to the resulting reduction in the thickness of the base layer that would be needed to maintain the optical interference boundary conditions for anti-reflecting the functional layer.

In an alternative embodiment in relation to the first aspect of the present invention, when the coated glass substrate comprises more than one silver-based functional layer, the layer based on an oxide of zinc (Zn) and tin (Sn) or based on an oxide of tin (Sn) of the lower anti-reflection layer preferably has a thickness of at least 12 nm. More preferably, the layer based on an oxide of zinc (Zn) and tin (Sn) or based on an oxide of tin (Sn) of the lower anti-reflection layer has a thickness of from 12 nm to 20 nm. Even more preferably, the layer based on an oxide of zinc (Zn) and tin (Sn) or based on an oxide of tin (Sn) of the lower anti-reflection layer has a thickness of from 12 nm to 16 nm. However, most preferably, the layer based on an oxide of zinc (Zn) and tin (Sn) or based on an oxide of tin (Sn) of the lower anti-reflection layer has a thickness of from 12 nm to 14 nm.

The layer based on an oxide of zinc (Zn) and tin (Sn) or based on an oxide of tin (Sn) of the lower anti-reflection layer is preferably located directly on the base layer based on an (oxi)nitride of silicon and/or an (oxi)nitride of aluminium, and/or an alloy of silicon and/or aluminium.

Where the layer based on an oxide of zinc (Zn) and tin (Sn) or based on an oxide of tin (Sn) of the lower anti-reflection layer is based on an oxide of zinc (Zn) and tin (Sn) (abbreviation: $ZnSnO_x$), the layer may preferably comprise: 10 to 90 weight % zinc (Zn) and 90 to 10 weight % tin (Sn); more preferably about 40 to 60 weight % zinc (Zn) and about 40 to 60 weight % tin (Sn); even more preferably about 50 weight % each of zinc (Zn) and tin (Sn), in weight % of the total metal content of the layer. In some preferred embodiments the layer based on an oxide of zinc (Zn) and tin (Sn) of the lower anti-reflection layer may comprise: at most 18 weight % tin (Sn), more preferably at most 15 weight % tin (Sn), even more preferably at most 10 weight % tin (Sn). The layer based on an oxide of Zn and Sn may be preferably deposited also by reactive sputtering of a mixed ZnSn target in the presence of $O_2$.

Preferably, the lower anti-reflection layer further comprises a separation between the layer based on an oxide of zinc (Zn) and tin (Sn) or an oxide of tin (Sn) and the layer based on an oxide of zinc (Zn).

The separation layer preferably comprises a metal oxide; and/or an (oxi)nitride of silicon and/or an (oxi)nitride of aluminium; and/or an alloy of silicon and/or aluminium.

In addition, the separation layer may preferably have a thickness of at least 0.5 nm; or preferably from 0.5 to 6 nm; more preferably from 0.5 to 5 nm; even more preferably from 0.5 to 4 nm; most preferably from 0.5 to 3 nm. These preferred thicknesses enable further improvement in haze upon heat treatment. The separation layer preferably provides protection during the deposition process and during a subsequent heat treatment. The separation layer is preferably either essentially fully oxidised immediately after deposition, or it oxidizes to an essentially fully oxidized layer during deposition of a subsequent oxide layer.

The separation layer may preferably comprise: a metal oxide; and/or an (oxi)nitride of silicon and/or aluminium; and/or an alloy of silicon and/or aluminium. When the separation layer is based on a metal oxide said separation layer may preferably comprise a layer based on an oxide of: Ti, Zn, NiCr, InSn, Zr, Al and/or Si.

When the separation layer is preferably based on a metal oxide, it may be deposited using non-reactive sputtering from a ceramic target based on for example a slightly sub-stoichiometric titanium oxide, for example a $TiO_{1.98}$ target, as an essentially stoichiometric or as a slightly sub-stoichiometric oxide, by reactive sputtering of a target based on Ti in the presence of $O_2$, or by depositing a thin layer based on Ti which is then oxidised. In the context of the present invention, an "essentially stoichiometric oxide" means an oxide that is at least 95% but at most 100% stoichiometric, whilst a "slightly sub-stoichiometric oxide" means an oxide that is at least 95% but less than 100% stoichiometric.

In addition to the metal oxide and/or the (oxi)nitride of silicon and/aluminium, and/or the alloy of silicon and/or aluminium upon which it is based, the separation layer may further include one or more other chemical elements chosen from at least one of the following elements: Ti, V, Mn, Co, Cu, Zn, Zr, Hf, Al, Nb, Ni, Cr, Mo, Ta, Si, or from an alloy based on at least one of these materials, used for instance as dopants or alloyants. Preferably however, a separation layer based on a metal oxide and/or an (oxi)nitride of silicon and/or aluminium does not include one or more other chemical elements.

In a preferred embodiment of the present invention, the separation layer is preferably based on a metal oxide, which comprises an oxide of zinc (Zn) and/or an oxide of titanium (Ti).

It is especially preferred that the separation layer is based on an oxide of titanium when the layer sequence of the coated glass comprises one silver-based functional layer.

Whilst the separation layer may also be based on an oxide of titanium when the layer sequence comprises more than one silver-based functional layer, it may also be preferred that when the layer sequence or stack comprises more than one silver-based functional layer that the layer sequence does not comprise a separation layer in the lower anti-reflection layer.

In addition, it is preferred that the separation layer has a thickness of from 0.5 to 3 nm when based on titanium oxide.

The layer based on an oxide of zinc (Zn) of the lower anti-reflective layer primarily functions as a growth promoting layer for a subsequently deposited silver-based functional layer. The layer based on an oxide of zinc (Zn) is optionally mixed with metals such as aluminium (Al) or tin (Sn) in an amount of up to about 10 weight % (weight % referring to the target metal content). A typical content of said metals such as aluminium (Al) or tin (Sn) is about 2 weight %, with Aluminium (Al) being actually preferred. Zinc oxide (ZnO) and mixed zinc (Zn) oxides have proven very effective as a growth promoting layer and thereby assisting in achieving a low sheet resistance at a given thickness of the subsequently deposited silver-based functional layer. It is preferred that the layer based on an oxide of zinc (Zn) of the lower anti-reflection layer is reactively sputtered from a zinc (Zn) target in the presence of oxygen ($O_2$). Alternatively, the layer based on an oxide of zinc (Zn) of the lower anti-reflection layer may be deposited by sputtering a ceramic target, for example based on ZnO:Al, in an atmosphere containing zero or only a small amount, that is, generally no more than about 5 volume %, of oxygen. The layer of the lower anti-reflection layer based on an oxide of zinc (Zn) may preferably have a thickness of at least 2 nm. More preferably, the layer of the lower anti-reflection layer based on an oxide of zinc (Zn) may preferably have a thickness of from 2 to 15 nm; or from 3 to 12 nm. Even more preferably the layer of the lower anti-reflection layer based on an oxide of zinc (Zn) may preferably have a thickness of from 4 to 10 nm. Most preferably the layer of the lower anti-reflection layer based on an oxide of zinc (Zn) has a thickness of from 5 to 8 nm.

In addition, in relation to the present invention it is preferred that the layer based on an oxide of zinc (Zn) in the lower anti-reflection layer is in direct contact with the silver-based functional layer. Consequently, in a preferred embodiment of the present invention the sequence of layers between the glass substrate and the silver-based functional layer may consist of the three layers or four layers of the lower anti-reflection layer described above.

The silver-based functional layer(s) preferably consists essentially of silver without any additive, as is normally the case in the area of low-emissivity and/or solar control coatings. It is however, within the scope of the invention to modify the properties of the silver-based functional layer(s) by adding doping agents, alloy additives or the like or even adding very thin metal or metal compound layers, as long as the properties of the silver-based functional layer(s) necessary to function as highly light-transmitting and low light-absorbent IR-reflective layer(s), are not substantially impaired thereby.

The thickness of each silver-based functional layer is dominated by its technical purpose. For typical low-emissivity and/or solar control purposes the preferred layer thickness for a single silver-based layer may preferably be from: 5 to 20 nm; more preferably from 5 to 15 nm; even more preferably from 5 to 13 nm or from 8 to 12 nm; most preferably from 9 to 11 nm. With such a layer thickness, light transmittance values of above 86% and a normal emissivity below 0.05 after a heat treatment may be readily achieved in accordance with the present invention for single silver coatings. If superior better solar control properties are required, the thickness of the silver-based functional layer may be adequately increased, or several spaced functional layers may be provided as further explained below.

While the invention is directed to coated substrates with only one silver-based functional layer, it is within the scope of the invention to apply the inventive concept to prepare low-emissivity and/or solar control coatings comprising two or more silver-based functional layers. When providing more than one silver-based functional layer, all of the silver-based functional layers are preferably spaced apart by intervening dielectric layers, referred to herein collectively as "central anti-reflection layers", to form a Fabry-Perot interference filter, whereby the optical properties of the low emissivity and/or solar control coating may be further optimized for the respective application.

Preferably, each silver-based functional layer is spaced apart from an adjacent silver-based functional layer by an intervening central anti-reflection layer. The intervening central anti-reflection layer(s) may comprise a combination of one or more of the following layers: a layer based on an (oxi)nitride of silicon and/or an (oxi)nitride of aluminium; a layer based on an oxide of Zn and Sn and/or an oxide of Sn; and a layer based on a metal oxide such as an oxide of Zn.

In some preferred embodiments each silver-based functional layer is spaced apart from an adjacent silver-based functional layer by an intervening central anti-reflection layer, wherein each central anti-reflection layer comprises at least, in sequence from the silver-based functional layer that is located nearest to the glass substrate:
- a layer based on an (oxi)nitride of silicon and/or an (oxi)nitride of aluminium; a layer based on an oxide of Zn and Sn and/or an oxide of Sn; and a layer based on a metal oxide such as an oxide of Zn.

The coated glass substrate according to the first aspect of the present invention preferably also comprises a barrier layer. The barrier layer is preferably located in direct contact with the silver based functional layer.

The barrier layer preferably comprises a layer based on $NiCrO_x$ or an oxide of zinc (Zn). The barrier layer based on an oxide of zinc (Zn) or NiCrOx, preferably has a thickness of at least 0.5 nm. More preferably the barrier layer based on an oxide of Zn or NiCrOx has a thickness of from 0.5 to 10 nm. Most preferably the barrier layer based on an oxide of Zn or NiCrOx has a thickness of from 1 to 10 nm.

However, when the barrier layer is a layer based on $NiCrO_x$, it preferably has a thickness of from 0.5 to 5 nm or 1.0 to 5 nm.

It has been found that a superior protection of the silver-based functional layer during the deposition process and a high optical stability during a heat treatment may be achieved if the barrier layer comprises a layer of a mixed metal oxide sputtered from a mixed metal oxide target. When the barrier layer is based on an oxide of zinc (Zn), said oxide may be a mixed metal oxide such as ZnO:Al. Good results are particularly achieved if a layer based on ZnO:Al is sputtered from a conductive ZnO:Al target. ZnO:Al may be deposited fully oxidized or such that it is slightly sub-oxidic.

In addition, it is possible when the barrier layer comprises a layer based on an oxide of zinc (Zn) for the barrier to actually comprise a number of zinc oxide layers such as layers based not only on a mixed metal oxide such as ZnO:Al, but also on an oxide of zinc (Zn) and tin (Sn). Suitable barrier layers may therefore be in the form of ZnO:Al, $ZnSnO_x$, ZnO:Al. Such triple barrier arrangements may preferably have a combined thickness of between 3 and 12 nm.

Further triple barrier arrangements may preferably be selected from the group consisting of the following combinations of layers in sequence from the silver-based functional layer: ZnO:Al/$TiO_x$/ZnO:Al, ZnO:Al/$ZnSnO_x$/ZnO:Al, $TiO_x$/$ZnSnO_x$/ZnO:Al, $TiO_x$/ZnO:Al/$TiO_x$, $TiO_x$/$ZnSnO_x$/$TiO_x$, and ZnO:Al/$ZnSnO_x$/$TiO_x$.

At least a portion of the barrier layer that is in direct contact with the silver-based functional layer is preferably deposited using non-reactive sputtering of an oxidic target to avoid silver damage.

In addition, and as an alternative to the barrier layer being based on an oxide of zinc (Zn), it has further been found that suitable protection of the silver-based functional layer during the deposition process and a high optical stability during heat treatment may be achieved also if the barrier layer comprises a mixed metal oxide based on nickel (Ni) and chromium (Cr), such as a layer of sub-stoichiometric $NiCrO_x$. This is especially the case when the coated glass substrate comprises two or more silver-based functional layers, however, the layer of sub-stoichiometric $NiCrO_x$ may also be used when the coated glass substrate comprises a single silver-based functional layer.

Therefore, for coated glass substrates comprising two or more silver based functional layers it is preferred if each silver-based functional layer is spaced apart from an adjacent silver-based functional layer by an intervening central anti-reflection layer, wherein each central anti-reflection layer comprises at least, in sequence from the silver-based functional layer that is located nearest to the glass substrate:
- a layer based on a mixed metal oxide comprising nickel (Ni) and chromium;
- a layer based on a mixed metal oxide based on zinc and aluminium;
- a layer based on an (oxi)nitride of silicon and/or an (oxi)nitride of aluminium;
- a layer based on an oxide of Zn and Sn or based on an oxide of Sn; and
- a layer based on a metal oxide such as an oxide of Zn.

Also in relation to the first aspect of the present invention, the coated glass preferably comprises an upper anti-reflective layer. The upper anti-reflective layer preferably comprises:

i) a layer based on an oxide of zinc (Zn) and tin (Sn) or based on an oxide of tin (Sn); and ii) a layer based on an oxide of zinc (Zn).

The layer based on an oxide of Zn and Sn or based on an oxide of Sn in the upper anti-reflective layer may preferably have a thickness of at least 0.5 nm; more preferably at least 0.5 nm or 1 nm, or even at least 1.5 nm, but preferably less than 5 nm; more preferably at most 4 nm; even more preferably less than 4 nm; most preferably at most 3 nm; and especially 2 nm. These preferred thicknesses enable further ease of deposition and improvement in optical characteristics such as haze whilst retaining mechanical durability.

The layer based on an oxide of Zn in the upper anti-reflective layer may preferably have a thickness of at least 0.5 nm, more preferably at least 0.5 nm or 1 nm; or even at least 1.5 nm; but preferably less than 5 nm; more preferably 4 nm. These preferred thicknesses also enable further ease of deposition and improvement in optical characteristics such as haze whilst retaining mechanical durability.

Preferably, the layers in the upper anti-reflective layer are based on essentially stoichiometric metal oxides. The use of layers based on essentially stoichiometric metal oxides in the upper anti-reflective layer rather than metallic or less than 95% stoichiometric layers leads to an extremely high optical stability of the coating during a heat treatment and effectively assists in keeping optical modifications during heat treatment small. Additionally, the use of layers based on essentially stoichiometric metal oxides provides benefits in terms of mechanical robustness.

In the context of the present invention the term "non-reactive sputtering" includes sputtering an oxidic target in a low oxygen atmosphere (that is with zero, or up to 5% volume oxygen) to provide an essentially stoichiometric oxide.

Also in the context of the present invention, where a layer is said to be "based on" a particular material or materials, this means unless stated otherwise, the layer predominantly comprises said material or materials in an amount of at least 50 atomic %.

Where a layer is based on $ZnSnO_x$, "$ZnSnO_x$" means a mixed oxide of Zn and Sn as described and defined elsewhere in the description.

To minimize any light absorption in the coating and to reduce the light transmittance increase during heat treatment, all individual layers of the upper and lower anti-reflection layers are preferably deposited with an essentially stoichiometric composition.

To further optimize the optical properties of the coated substrate the upper anti-reflection layers may comprise further partial layers consisting of suitable materials generally known for dielectric layers of low-e and/or solar control coatings, in particular chosen from one or more of the oxides of Sn, Ti, Zn, Nb, Ce, Hf, Ta, Zr, Al and/or Si and/or of (oxi)nitrides of Si and/or Al or combinations thereof. When adding such further partial layers it should however be verified that the heat treatability aimed at herein is not impaired thereby.

It will be appreciated that any further layer may contain additives that modify its properties and/or facilitate its manufacture, for example, doping agents or reaction products of reactive sputtering gases. In the case of oxide based layers, nitrogen may be added to the sputtering atmosphere leading to the formation of oxinitrides rather than oxides, in the case of nitride based layers oxygen may be added to the sputtering atmosphere, also leading to the formation of oxinitrides rather than nitrides.

The dielectric layer which comprises an oxynitride of aluminium (Al), zinc (Zn) and tin (Sn) may be the outermost layer upon the coated glass substrate. Alternatively, the coated glass substrate may further comprise at least one additional layer such that the dielectric layer of an oxynitride of aluminium (Al), zinc (Zn) and tin (Sn) is between the at least one additional layer and the glass substrate. Preferably, the at least one additional layer comprises: a layer either based on an oxide of zinc (Zn) and tin (Sn) or based on an oxide of tin (Sn); and/or a layer based on an oxide of zirconium (Zr). Such additional layers may increase the durability of the coated substrate.

It is clear that the material, structure and thickness selection of any layer in the sequence stack is important and that alterations to same may have a negative impact on coating performance. It is therefore clear that when adding any further layer to the existing layer sequence described above in relation to the present invention that that the properties of the coating stack such as high thermal stability, are not significantly impaired.

According to a second aspect of the present invention there is provided a method of manufacturing a coated glass substrate according to a first aspect of the present invention comprising:
  i) providing a glass substrate;
  ii) providing a lower anti-reflection layer;
  iii) providing a silver-based functional layer;
  iv) providing a barrier layer; and
  v) providing an upper anti-reflection layer; and
  vi) providing a dielectric layer which comprises an oxynitride of aluminium (Al), zinc (Zn) and tin (Sn), wherein the dielectric layer comprises at least 5 atomic percent aluminium; and wherein any portion of the barrier layer that is in direct contact with the silver-based functional layer is deposited by sputtering in an atmosphere with less than 5 volume percent oxygen.

The invention is not limited to a specific production process for the coating. However, it is particularly preferred if at least one of the layers and most preferably all layers are applied by magnetron cathode sputtering, either in the DC mode, in the pulsed mode, in the medium frequency mode or in any other suitable mode, whereby metallic or semiconducting targets are sputtered reactively or non-reactively in a suitable sputtering atmosphere. Depending on the materials to be sputtered, planar or rotating tubular targets may be used.

The layers based on an oxide of Zn, Ti, ZnSn, InSn, Zr, Al, Sn and/or Si, and/or an (oxi)nitride of Si and/or of Al, may be deposited by non-reactive sputtering. Said layers may be sputtered from ceramic targets.

The layers based on an oxide of Zn, Ti, ZnSn, InSn, Zr, Al, Sn and/or Si, and/or an (oxi)nitride of Si and/or of Al, may also be deposited by reactive sputtering. Said layers may be sputtered from one or more metal targets.

The coating process is preferably carried out by setting up suitable coating conditions such that any oxygen (or nitrogen) deficit of any oxide (or nitride) layer of the anti-reflection layers of the coating is kept low, to achieve a high stability of the light transmittance and colour of the coated glass substrates during heat treatment.

Light transmittance values referred to in the specification are generally specified with reference to a coated glass substrate comprising a 4 mm thick standard float glass substrate having a light transmittance $T_L$ in the region of 90% without a coating.

While a neutral reflection and transmission colour of the coated glass substrates is usually aimed at, the colour of the coated glass substrates according to the invention may be varied widely by adapting the thicknesses of the individual layers appropriately according to the intended visual appearance of the product.

The thermal stability of coated glass substrates according to the invention is reflected by the fact that the heat-treated coated glass substrates do not exhibit unacceptable levels of haze. Large increases in the haze value (hazescan) if detected during a heat treatment would indicate that the coating is beginning to be damaged. The mechanical durability of coated glass substrates according to the invention is exemplified by the performance in oil rub tests.

According to a third aspect of the present invention there is provided a multiple glazing unit incorporating a coated glass substrate according to the first aspect of the present invention, or prepared by the method according to the second aspect of the present invention. In addition, the multiple glazing unit according to the third aspect of the present invention may be a laminated glazing unit or an insulated glazing unit.

In addition, all features and preferences associated with the coated glass substrate and layer sequence of the first aspect of the present invention including for example but not limited to details of the lower anti-reflection layer, upper anti-reflection layer, silver-based functional layer, barrier layer and dielectric layer, are also preferred in relation to the second and third aspects of the present invention.

The present invention will now be explained in more detail by reference to the following non-limiting examples.

In relation to the examples.

A series of experiments were conducted to assess the impact of using a dielectric layer comprising an oxynitride of aluminium (Al), zinc (Zn) and tin (Sn), with at least 5 atomic percent aluminium in a layer stack sequence deposited on a float glass substrate.

A series of coating layers (referred to as a stack) were deposited on a float glass substrate.

The coating layers included at least one silver-based coating layer. The series of layers are identified in Tables 1, 2 and 3.

For all examples the coating layers were deposited on 4 mm thick standard float glass substrates with a light transmittance in the region of 90%, using single or dual magnetrons equipped with MF-AC and or DC magnetron (or pulsed DC) power supplies.

Dielectric layers of an oxide of zinc and tin (ZnSnO$_x$) were reactively sputtered from zinc-tin targets (weight ratio Zn:Sn approximately 50:50) in an argon/oxygen (Ar/O$_2$) sputter atmosphere.

The titanium oxide (TiO$_x$) layers were deposited from metallic titanium (Ti) targets in an argon/oxygen (Ar/O$_2$) sputter atmosphere.

The ZnO:Al growth promoting top layers of the lower anti-reflection layers were sputtered from Al-doped Zn targets (aluminium (Al) content about 2 weight %) in an Ar/O$_2$ sputter atmosphere with less than 5 volume percent oxygen.

The functional layers that in all of the examples consisted of essentially pure silver (Ag), were sputtered from silver targets in an Ar sputter atmosphere without any added oxygen and at a partial pressure of residual oxygen below $10^{-5}$ mbar.

The barrier layers of Al-doped zinc oxide (ZnO:Al), located above the silver-based functional layers, were sputtered from conductive ZnO$_x$:Al targets in an Ar/O$_2$ sputter atmosphere with less than 5 volume percent oxygen.

The layers of mixed silicon aluminium nitride (Si$_{90}$Al$_{10}$N$_x$) were reactively sputtered from mixed Si$_{90}$Al$_{10}$ targets in an Argon/Nitrogen (Ar/N$_2$) sputter atmosphere containing only residual oxygen.

The layers of AlN were reactively sputtered from an Al target in an Argon/Nitrogen (Ar/N$_2$) sputter atmosphere containing only residual oxygen.

The layers of mixed aluminium, zinc, tin, oxynitride were co-sputtered using two aluminium targets and a conductive ceramic mixed zinc tin oxide (ZnSnO$_x$) target in an Ar/O$_2$/N$_2$ atmosphere.

Tables 1, 2 and 3 provide details of the coating layer sequences, with the geometrical thicknesses of each layer provided in nanometres (nm) in brackets. For the comparative coated glass substrate examples and the example coated glass substrates according to the present invention, each example was tested to determine:

the outermost layer metal content, hazescan, oil rub test value, sliding angle test value, scratch load test value, T$_L$%—percentage (%) light transmittance value for the glass substrate before heat treatment, ΔT$_L$—the change in percentage (%) light transmittance upon heat treatment, Rs AD—sheet resistance before heat treatment, Rs HT—sheet resistance after heat treatment, Δ Rs (ohm/square)—change is heat resistance, and T ΔE*—which is a measure of the change in transmitted colour upon heat treatment.

For each example, the layers were deposited onto a glass substrate in the sequence shown starting with the layer at the top of each column.

TABLE 1

|  | Example 1 Comparative | Example 2 | Example 3 | Example 4 |
|---|---|---|---|---|
|  | Si$_{90}$Al$_{10}$N$_x$ (33) | Si$_{90}$Al$_{10}$N$_x$ (33) | Si$_{90}$Al$_{10}$N$_x$ (33) | Si$_{90}$Al$_{10}$N$_x$ (33) |
|  | ZnSnO$_x$ (4) | ZnSnO$_x$ (4) | ZnSnO$_x$ (4) | ZnSnO$_x$ (4) |
|  | TiO$_x$ (2) | TiO$_x$ (2) | TiO$_x$ (2) | TiO$_x$ (2) |
|  | ZnO:Al (7) | ZnO:Al (7) | ZnO:Al (7) | ZnO:Al (7) |
|  | Ag (9) | Ag (9) | Ag (9) | Ag (9) |
|  | ZnO:Al (2) | ZnO:Al (2) | ZnO:Al (2) | ZnO:Al (2) |
|  | ZnSnO$_x$ (2) | ZnSnO$_x$ (2) | ZnSnO$_x$ (2) | ZnSnO$_x$ (2) |
|  | ZnO:Al (4) | ZnO:Al (4) | ZnO:Al (4) | ZnO:Al (4) |
|  | AlN$_x$ (26) | AlZnSnO$_x$N$_y$ (34) | AlZnSnO$_x$N$_y$ (34) | AlZnSnO$_x$N$_y$ (34) |
|  | ZnSnO$_x$ (8) | — | — | — |
| AlZnSnO$_x$N$_y$ atomic % metal content | — | Al (34.2), Zn (4.0), Sn (3.1) | Al (27.7), Zn (8.2), Sn (5.7) | Al (24.7), Zn (10.1), Sn (6.6) |
| Sliding angle (°) | 36 | 30 | 39 | 26 |
| Scratch load (N) | 0.5 | 1.0 | 0.75 | 1.25 |
| T$_L$ | 87.7 | 87.7 | 88.0 | 87.7 |
| ΔT$_L$ | 2.5 | 2.4 | 2.6 | 2.6 |
| Rs AD (ohm/sq) | 6.2 | 6.6 | 6.5 | 6.6 |
| Rs HT (ohm/sq) | 4.6 | 4.5 | 4.2 | 4.6 |
| ΔRs (ohm/sq) | 1.6 | 1.9 | 2.3 | 2.2 |
| T ΔE* | — | 1.01 | 1.6 | 1.74 |
| Oil-rub | 0 | 0 | 0 | 3 |
| Hazescan | 82.5 | 100 | 75 | 68 |

TABLE 2

| | Example 5 | Example 6 | Example 7 | Comparative Example 8 |
|---|---|---|---|---|
| | $Si_{90}Al_{10}N_x$ (33) | $Si_{90}Al_{10}N_x$ (33) | $Si_{90}Al_{10}N_x$ (33) | $Si_{90}Al_{10}N_x$ (33) |
| | $ZnSnO_x$ (4) | $ZnSnO_x$ (4) | $ZnSnO_x$ (4) | $ZnSnO_x$ (4) |
| | $TiO_2$ (2) | $TiO_2$ (2) | $TiO_2$ (2) | $TiO_2$ (2) |
| | ZnO:Al (7) | ZnO:Al (7) | ZnO:Al (7) | ZnO:Al (7) |
| | Ag (9.0) | Ag (9.0) | Ag (9.0) | Ag (9.0) |
| | ZnO:Al (2) | ZnO:Al (2) | ZnO:Al (2) | ZnO:Al (2) |
| | $ZnSnO_x$ (2) | $ZnSnO_x$ (2) | $ZnSnO_x$ (2) | $ZnSnO_x$ (2) |
| | ZnO:Al (4) | ZnO:Al (4) | ZnO:Al (4) | ZnO:Al (4) |
| | $AlZnSnO_xN_y$ (34) | $AlZnSnO_xN_y$ (34) | $AlZnSnO_xN_y$ (34) | $ZnSnO_x$ (34) |
| $AlZnSnO_xN_y$, atomic % metal content | Al (17.9), Zn (16.4), Sn (8.5) | Al (13.4), Zn (21.1), Sn (9.7) | Al (5.6), Zn (29.5), Sn (11.6) | — |
| Sliding angle (°) | 35 | 42 | 20 | 47.7 |
| Scratch load (N) | 0.5 | 0.5 | 0.5 | 0.5 |
| $T_L$ | 87.6 | 87.6 | 87.3 | 87.6 |
| $\Delta T_L$ | 1.3 | 1.8 | 2.4 | 1.0 |
| Rs AD (ohm/sq) | 6.6 | 6.7 | 6.4 | 6.4 |
| Rs HT (ohm/sq) | 4.5 | 5.0 | 4.7 | 4.9 |
| $\Delta$Rs (ohm/sq) | 2.1 | 1.7 | 1.7 | 1.5 |
| T $\Delta E^*$ | 1.42 | 0.78 | 2.25 | 0.46 |
| Oil-rub | 0 | 0 | 0 | 2 |
| Hazescan | 173 | 201 | 134 | 223 |

TABLE 3

| | Example 9 | Example 10 | Example 11 | Example 12 |
|---|---|---|---|---|
| | $Si_{90}Al_{10}N_x$ (33) | $Si_{90}Al_{10}N_x$ (33) | $Si_{90}Al_{10}N_x$ (33) | $Si_{90}Al_{10}N_x$ (33) |
| | $ZnSnO_x$ (4) | $ZnSnO_x$ (4) | $ZnSnO_x$ (4) | $ZnSnO_x$ (4) |
| | $TiO_2$ (2) | $TiO_2$ (2) | $TiO_2$ (2) | $TiO_2$ (2) |
| | ZnO:Al (7) | ZnO:Al (7) | ZnO:Al (7) | ZnO:Al (7) |
| | Ag (9.0) | Ag (9.0) | Ag (9.0) | Ag (9.0) |
| | ZnO:Al (2) | ZnO:Al (2) | ZnO:Al (2) | ZnO:Al (2) |
| | $ZnSnO_x$ (2) | $ZnSnO_x$ (2) | $ZnSnO_x$ (2) | $ZnSnO_x$ (2) |
| | ZnO:Al (4) | ZnO:Al (4) | ZnO:Al (4) | ZnO:Al (4) |
| AlZnSnOxNy from monolithic AlZnSn target | AlZnSnOxNy (46.5 nm) | AlZnSnOxNy (31 nm) | AlZnSnOxNy (53.2) | AlZnSnOxNy (49.6 nm) |
| Sputter gas (sccms) | Ar 80, $N_2$ 150, $O_2$ 6 | Ar 50, $N_2$ 200, $O_2$ 6 | Ar 250, $N_2$ 50, $O_2$ 12 | Ar 50, $N_2$ 50, $O_2$ 6 |
| $AlZnSnO_xN_y$, atomic % metal content | Al (83.6), Zn (9.7), Sn (6.7) | Al (83.6), Zn (9.7), Sn (6.7) | Al (83.6), Zn (9.7), Sn (6.7) | Al (83.6), Zn (9.7), Sn (6.7) |
| $T_L$ | 88.1 | 86 | 87.9 | 87.8 |
| $\Delta T_L$ | 2 | 3.3 | 1.9 | 2 |
| Rs AD (ohm/sq) | 6.1 | 6.2 | 6.5 | 6.5 |
| Rs HT (ohm/sq) | 4 | 4 | 4.3 | 4.5 |
| $\Delta$Rs (ohm/sq) | 2.1 | 2.2 | 2.2 | 2 |
| T $\Delta E^*$ | 2.1 | 3.3 | 2 | 2.1 |
| Oil-rub | 3 | 6 | 2 | 0 |
| Hazescan | 110 | 166 | 184 | 176 |

The methodology used to collect the data in Tables 1, 2 and 3 is set out below.

Oil rub test—an oil rub test serves to simulate the influence of cutting oils used for cutting glass substrates on the mechanical robustness of a coating. Coated glass substrates that do not withstand an oil rub test are difficult to process and are unsuitable for most practical applications. The coated samples defined in Tables 1, 2 and 3 were rubbed using a felt pad with an area 1.2×1.2 cm soaked in microscope oil of refractive index 1.52 (1.515 to 1.517). The samples are subjected to 500 cycles with a 1,000 g load at a speed of 37 cycles per minute. The oil rubbed samples were then evaluated using an internal evaluation system on a perfectness scale of 0 (perfect, no damage) to 9 (part of coating stack completely removed). A score of 6 or less is preferred.

Heat treatability tests—immediately after deposition of all of the coatings in each example, the coating stack parameters (such as hazescan, sheet resistance (Rs), light transmittance ($T_L$)) and colour co-ordinates for the coated glass substrates were measured. The samples were then heat treated in the region of 650° C. for 5 minutes. Thereafter, the hazescan value, sheet resistance (Rs), percentage light transmittance ($T_L$) and colour coordinates were again measured and the change in light transmittance ($\Delta T_L$), and the change in transmission colour upon heat treatment (T $\Delta E^*$), calculated therefrom. The measured results are also provided in Tables 1, 2 and 3 above.

The values stated for the change in percentage (%) light transmittance upon heat treatment ($\Delta T_L$) of the coated glass substrates each of the examples were derived from measurements according to EN 140, the details of which are incorporated herein by reference.

Sheet Resistance/Change in sheet resistance—sheet resistance measurements were made using a NAGY SRM-12 for comparative examples 1 and 8 and examples 2 to 7 and 9 to 12. This device utilises an inductor to generate eddy currents in a 100 mm×100 mm coated sample. This produces a measurable magnetic field, the magnitude of which is related to the resistivity of the sample. With this method the sheet resistance can be calculated. The instrument was used to measure the sheet resistance of samples before and after heat treatment at 650° C. for 5 minutes.

Colour characteristics—the colour characteristics for each of the examples in Tables 1, 2 and 3 were measured and reported using the well-established CIE LAB L*, a*, b* coordinates (as described for example in paragraphs [0030] and [0031] of WO 2004/063111A1, incorporated herein by reference). The change in transmission colour upon heat treatment, T $\Delta E^*=((\Delta a^*)^2+(\Delta b^*)^2+(\Delta L^*)^2)^{1/2}$, wherein $\Delta L^*$, $\Delta a^*$ and $\Delta b^*$ are the differences of the colour values L*, a*, b* of the coated glass substrate each before and after a heat treatment. ΔE* values of less than 3 (for example 2 or 2.5) are preferred for layer sequences with one silver-based functional layer, representing a low and practically non-noticeable colour modification caused by the heat treatment. For layer sequences comprising two or more silver-based functional layer, lower T ΔE* values provide an indication of the stability of the sequences; the lower the T ΔE* values the more superior the results and appearance of the coated glass substrate.

Hazescan—A haze scoring system was applied to each of the examples in Tables 1, 2 and 3. The quality assessment evaluation system described hereinafter was also used to more clearly distinguish the visual quality of coatings under bright light conditions; properties that are not fully reflected by standard haze values measured in accordance with ASTM D 1003-61.

The evaluation system considers the more macroscopic effect of visible faults in the coating which cause local colour variations where the coating is damaged or imperfect (hazescan in Tables 1, 2 and 3). This assessment analyses the light levels in images of heat-treated samples taken using fixed lighting conditions and geometries.

To generate the images used to calculate hazescan values, samples are placed inside a black box, 30 cm away from the camera lens. Samples are illuminated using a standard 1200 lumen light with a brightness between 2400 and 2800 Lux, as measured at the samples position. The sample is then photographed using a constant aperture size and exposure length. The greyscale of each pixel in the resulting image is then recorded, with a value of 0 representing black and 255 representing white. Statistical analysis of these values is undertaken to give an overall assessment of the haze of the sample, referred to herein as the hazescan value. The lower the hazescan value recorded, the more superior the results.

Sliding angle test—the sliding angle measurement provides an indication of the coefficient of friction of an outermost layer of the coating. To complete the test a sample is placed on top of a steel flat bed and a block with two felt pads attached to the bottom is placed on top of the sample such that the felt pads touch the samples. The angle of the flat bed is raked until the block slides down the sample, generating the sliding angle.

Scratch load test—the scratch load test is a measure of the ability of a coating to resist scratching. A sclerometer with a tungsten carbide tip is used to carry out the test. The tip is dragged across the surface in a number of adjacent positions. This process is repeated with increasing loads applied to the sclerometer until three significant scratches are observed. A significant scratch being defined as a continuous scratch or the removal of a large amount of material from the coating. Higher loads indicate increased resistance to scratching.

Summary of Results

Comparative Example 1 comprises a stack with dielectric layers of $AlN_x$ and $ZnSnO_x$ in the upper anti-reflection layer located about a first silver-based functional layer. Comparative Example 1 provides a good result for the hazescan value and for the mechanical robustness test. However, comparative example 1 has both an $AlN_x$ layer and a $ZnSnO_x$ layer in the upper anti-reflective layer. Consequently, comparative example 1 does not address the aim of the present invention, namely to reduce the number of coating layers in the stack sequence and thereby reduce the capital outlay required in producing such a coating sequence.

Likewise, comparative Example 8 comprises a stack with a dielectric layer of $ZnSnO_x$ uppermost in the stack sequence but lacks a layer of $AlN_x$. Comparative Example 8 exhibits poor performance in terms of the hazescan value indicating that the single layer of $ZnSnO_x$ is not a suitable single layer substitution for the double layer of $AlN_x$ and $ZnSnO_x$ in comparative example 1.

Examples 2 to 7 and 9 to 12 according to the present invention comprise a layer of $AlZnSnO_xN_y$ replacing the dielectric layers of AlN and $ZnSnO_x$ of Comparative Example 1. The amounts of aluminium (Al), zinc (Zn) and tin (Sn) vary for each of examples 2 to 7 and 9 to 12.

All examples according to the invention demonstrated acceptable optical properties, with transmission values above 79%, a change in transmission value following heat treatment of less than 3.5, and a change in colour value following heat treatment of less than 3.5. In addition, all examples showed acceptable electrical properties, with sheet resistance values below 7 ohm/sq and change in sheet resistance values following heat treatment of less than 2.5.

Figure 1:
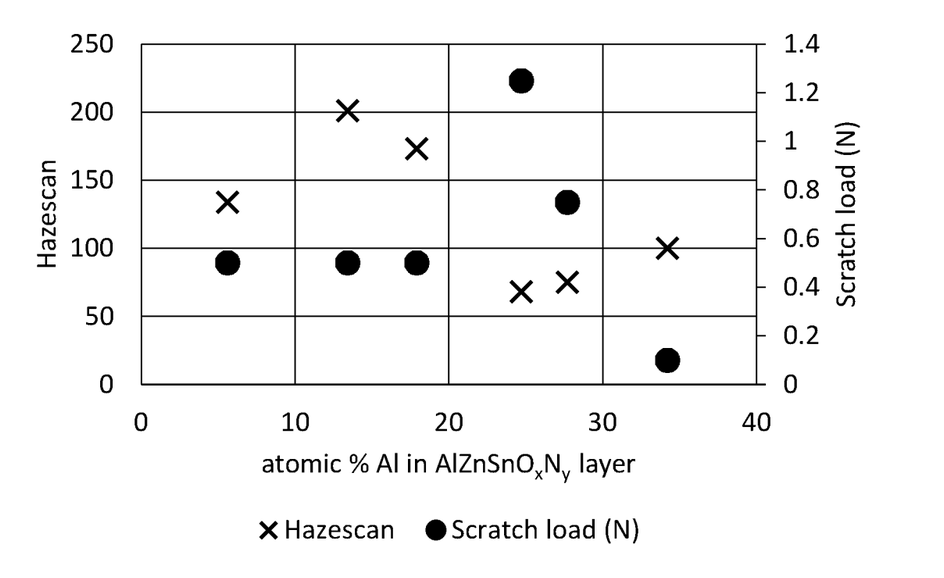
FIG. 1, is a graphical representation of hazescan and scratch load values against atomic % of Al in AlZnSnO$_x$N$_y$, for examples 2 to 7.

In regard to the hazescan results, all of examples 2 to 7 and 9 to 12 according to the present invention delivered acceptable values of around 200 or less. However, as depicted in FIG. 1, a particular improvement in hazescan was observed for examples 3 and 4 (relative to the value obtained for comparative example 1 in Table 1), and example 2 also provided an acceptable hazescan value. Example 9 in Table 3 also provided an acceptable hazescan value.

FIG. 1 also illustrates that for the scratch load test, example 2 showed particularly good mechanical durability with a value of 1.0. Example 2 therefore offers a good compromise where durability is desired over a reduction in haze.

Therefore, it can be seen from the above results that the coated glass substrates of the present invention provide good heat treatability and mechanical durability, with a single dielectric layer of $AlZnSnO_xN_y$ (wherein the amount of aluminium in the layer comprises at least 5 atomic percent), in the upper anti-reflection layer.

The coated glass substrates of the present invention also show a low level of visible damage according to the tests simulating use, processing and handling conditions. Furthermore, the coated glass substrates exhibit high light transmittance and low emissivity and/or good solar control properties, with optical properties remaining stable even after heat treatment.

Coated glass substrates according to the present invention may be suitable for use in architectural glazings such as in buildings, including insulated glazing units and facades. Alternatively, coated glass substrates according to the present invention may be suitable for use in vehicular glazings such as in passenger cars, mass transit carriages and buses, goods vehicles, and marine vehicles or aircraft, including windscreens, backlights, rooflights, sidelights and quarterlights.

The invention claimed is:

1. A coated glass substrate comprising at least the following layers in sequence from the glass substrate:
   a lower anti-reflection layer;
   a silver-based functional layer;
   a barrier layer; and
   an upper anti-reflection layer,
   wherein the upper anti-reflection layer comprises:
   a dielectric layer of an oxynitride of aluminium (Al), zinc (Zn) and tin (Sn) comprised of at most 30 atomic percent zinc, at most 15 atomic percent tin, and aluminium in the range of from 20 atomic percent aluminium to 30 atomic percent aluminium.

2. The coated glass substrate according to claim 1, wherein the dielectric layer of an oxynitride of aluminium (Al), zinc (Zn) and tin (Sn) comprises from 22 atomic percent aluminum to 28 atomic percent aluminium.

3. The coated glass substrate according to claim 1, wherein the dielectric layer of on an oxynitride of aluminium (Al), zinc (Zn) and tin (Sn) comprises a thickness of 10 to 50 nm.

4. The coated glass substrate according to claim 1, wherein: the barrier layer is in direct contact with the silver-based functional layer; or the barrier layer has a thickness of from 1 to 10 nm and comprises a layer based on $NiCrO_x$ or an oxide of zinc (Zn).

5. The coated glass substrate according to claim 1, wherein the lower anti-reflection layer comprises in sequence from the glass substrate:
- a layer based on an oxide of zinc (Zn) and tin (Sn) or an oxide of tin (Sn); and
- a layer based on an oxide of zinc (Zn).

6. The coated glass substrate according to claim 5, wherein the layer based on an oxide of zinc (Zn) and tin (Sn) or an oxide of tin (Sn) has a thickness of from 0.5 to 15 nm.

7. The coated glass substrate according to claim 5, wherein the layer based on an oxide of zinc (Zn) and tin (Sn) or an oxide of tin (Sn) has a thickness of from 12 to 20 nm.

8. The coated glass substrate according to claim 5, wherein the lower anti-reflection layer further comprises a separation layer located between the layer based on an oxide of zinc (Zn) and tin (Sn) or an oxide of tin (Sn) and the layer based on an oxide of zinc (Zn.

9. The coated glass substrate according to claim 8, wherein the separation layer comprises:
- a metal oxide; and/or
- an (oxi)nitride of silicon and/or aluminium; and/or
- an alloy of silicon and/or aluminium.

10. The coated glass substrate according to claim 9, wherein the separation layer further includes one or more other chemical elements chosen from at least one of the following elements: Ti, V, Mn, Co, Cu, Zn, Zr, Hf, Al, Nb, Ni, Cr, Mo, Ta, Si, or from an alloy based on at least one of these materials.

11. The coated glass substrate according to claim 8, wherein the separation layer has a thickness of from 0.5 to 6 nm.

12. The coated glass substrate according to claim 8, wherein the separation layer comprises an oxide of zinc (Zn) and/or an oxide of titanium (Ti).

13. The coated glass substrate according to claim 5, wherein the lower anti-reflection layer further comprises a base layer located between the glass substrate and the layer based on an oxide of zinc (Zn) and tin (Sn) or an oxide of tin (Sn), and wherein the base layer comprises:
- an (oxi)nitride of silicon and/or aluminium; and/or
- an alloy of silicon and/or aluminium; and
- wherein the base layer comprises a thickness of from 20 to 40 nm.

14. The coated glass substrate according to claim 13, wherein the base layer is in direct contact with the layer based on an oxide of zinc (Zn) and tin (Sn) or an oxide of tin (Sn).

15. The coated glass substrate according to claim 5, wherein the layer based on an oxide of zinc (Zn) in the lower anti-reflection layer comprises a thickness of from 2 to 15 nm.

16. The coated glass substrate according to claim 5, wherein the layer based on an oxide of zinc (Zn) in the lower anti-reflection layer is in direct contact with the silver-based functional layer.

17. The coated glass substrate according to claim 1, wherein the silver-based functional layer has a thickness of from 5 to 20 nm.

18. The coated glass substrate according to claim 1, wherein the upper anti-reflection layer comprises:
   i) a layer based on an oxide of zinc (Zn) and tin (Sn) or an oxide of tin (Sn; and
   ii) a layer based on an oxide of zinc (Zn.

19. The coated glass substrate according to claim 1, wherein the substrate comprises more than one silver-based functional layer, and wherein each silver-based functional layer is spaced apart from an adjacent silver-based functional layer by an intervening central anti-reflection layer.

20. The coated glass substrate according to claim 1, further comprising at least one additional layer in the upper anti-reflection layer, wherein the at least one additional layer is located above or below the dielectric layer of an oxynitride of aluminium (Al), zinc (Zn) and tin (Sn); and wherein the at least one additional layer comprises: a layer based on an oxide of zinc (Zn) and tin (Sn) or an oxide of tin (Sn); and/or a layer based on an oxide of zirconium (Zr).

21. The coated glass substrate according to claim 1, wherein the upper anti-reflection layer comprises:
   i) a layer of a thickness in the range 1 to 10 nm and based on an oxide of zinc (Zn) and tin (Sn) or an oxide of tin (Sn); and
   ii) a layer of a thickness in the range 1 to 10 nm and based on an oxide of zinc (Zn).

22. A multiple glazing unit incorporating a coated glass substrate in accordance with claim 1.

23. A method of manufacturing a coated glass substrate in accordance with claim 1, comprising:
   i) providing a glass substrate;
   ii) providing a lower anti-reflection layer;
   iii) providing a silver-based functional layer;
   iv) providing a barrier layer;
   v) providing an upper anti-reflection layer; and
   vi) providing a dielectric layer which comprises an oxynitride of aluminium (Al), zinc (Zn) and tin (Sn), wherein the dielectric layer comprises from 20 atomic percent aluminum to 30 atomic percent aluminium; and wherein any portion of the barrier layer that is in direct contact with the silver-based functional layer is deposited by sputtering in an atmosphere with less than 5 volume percent oxygen.

\* \* \* \* \*

UNITED STATES PATENT AND TRADEMARK OFFICE
CERTIFICATE OF CORRECTION

PATENT NO. : 12,017,951 B2
APPLICATION NO. : 17/776281
DATED : June 25, 2024
INVENTOR(S) : Charlie James Patrickson, Rachel Yeates and Philip Savage It is certified that error appears in the above-identified patent and that said Letters Patent is hereby corrected as shown below:

In the Claims

Claim 8, Line 5, "zinc (Zn" should be changed to -- zinc (Zn) --.

Claim 18, Line 4, "tin (Sn" should be changed to -- tin (Sn) --.

Claim 18, Line 5, "zinc (Zn" should be changed to -- zinc (Zn) --.

Signed and Sealed this
Eighth Day of October, 2024

Katherine Kelly Vidal
*Director of the United States Patent and Trademark Office*